Patented Oct. 6, 1925.

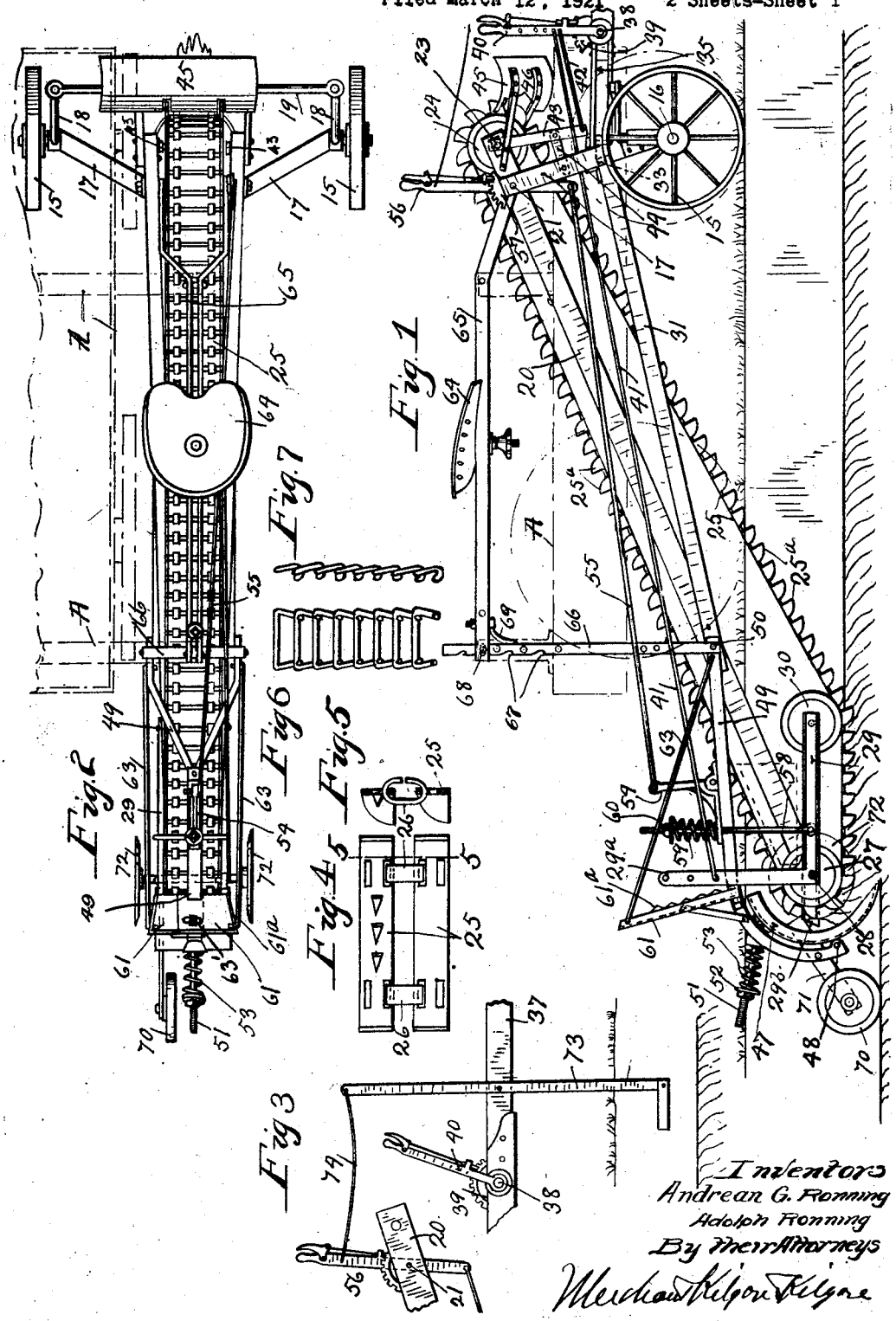

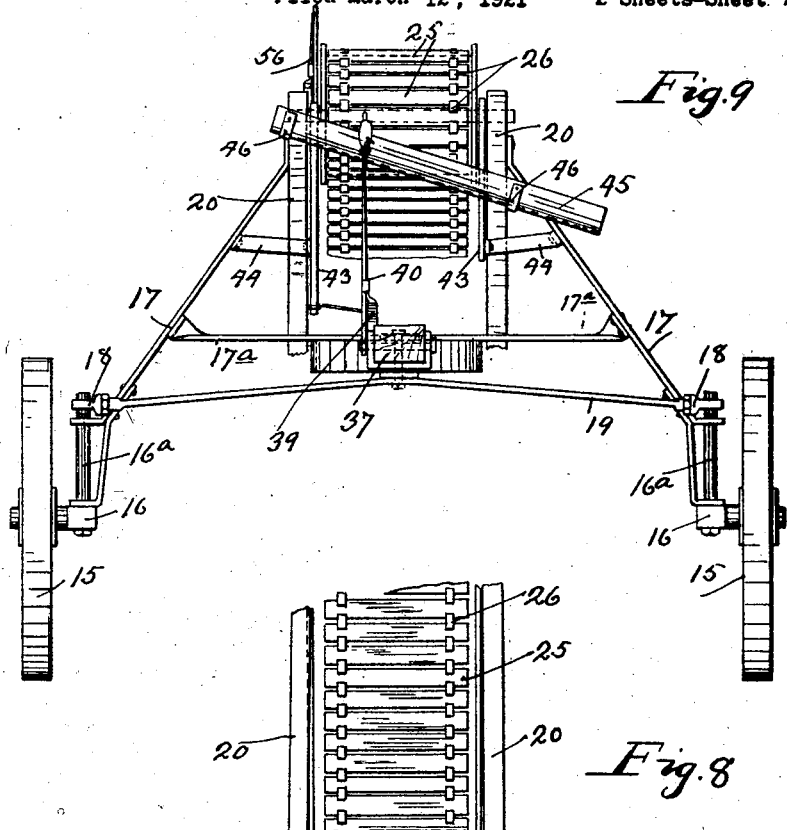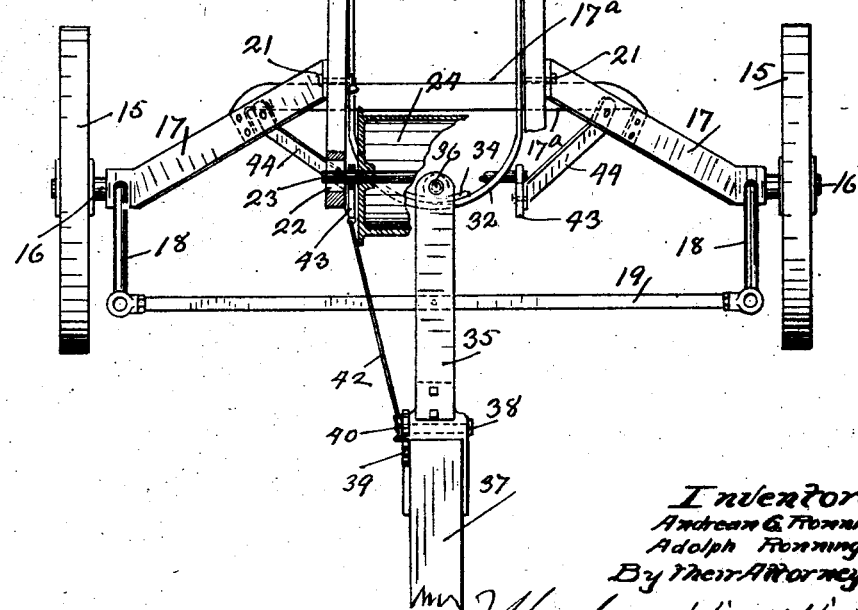

1,556,549

UNITED STATES PATENT OFFICE.

ANDREAN G. RONNING AND ADOLPH RONNING, OF MINNEAPOLIS, MINNESOTA, ASSIGNORS TO RONNING MACHINERY COMPANY, OF MINNEAPOLIS, MINNESOTA, A CORPORATION OF MINNESOTA.

DITCHER.

Application filed March 12, 1921. Serial No. 451,747.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Ditchers; and we do hereby declare the following to be a full, clear, and exact description of the invention, such as will enable others skilled in the art to which it appertains to make and use the same.

Our present invention provides a simple and highly efficient excavator of the type generally designated as a ditcher, but the principles of construction and operation involved are capable of very general application. One of the important features of the invention is directed to an arrangement of excavating and conveying belt and co-operating devices whereby said belt may be driven wholly or in part by its own tractive engagement with the ground. The invention, however, involves various other important features, as will hereinafter be described and defined in the claims.

In the accompanying drawings, which illustrate the invention, like characters indicate like parts throughout the several views.

Referring to the drawings:

Fig. 1 is a side elevation showing the ditcher attached to and drawn from a truck, which latter may be and usually will be drawn by horses;

Fig. 2 is a plan view of the parts shown in Fig. 1;

Fig. 3 is a fragmentary side elevation showing portions removed from Fig. 1;

Fig. 4 is a fragmentary plan view showing several links of the excavating belt or conveyor;

Fig. 5 is a section on the line 5—5 of Fig. 4;

Fig. 6 is a fragmentary plan showing several links of a modified form of excavating belt;

Fig. 7 is an edge elevation of the chain links shown in Fig. 6;

Fig. 8 is a view partly in plan and partly in horizontal section, with some parts removed showing the front portion of the excavator; and Fig. 9 is a front elevation of the excavator.

Referring first to the construction illustrated in Figs. 1 to 5, inclusive, the numeral 15 indicates the wheels of a two-wheeled truck, said wheels being journaled on pivoted spindles 16, the upright shafts of which are journaled in a trussed A-frame 17, see particularly Figs. 8 and 9, and, at the upper ends of their vertical shafts $16^a$, are provided with arms 18 cross-connected by a spindle-connecting rod 19, thus connecting the wheels for steering movements. A long excavator frame 20, near its upper front end, is pivoted at 21 to the separated upper portions of the A-frame 17, and at its front ends, said frame is provided with slots 22 in which a short cross shaft 23 is arranged to rotate and slide. This shaft 23 carries a belt-guiding drum 24, over which works an endless conveyor belt which may take different forms but, as shown, is made up of slats 25 and connecting links 26. At the lower end of the elevator frame is another belt-guiding drum 27, the shaft 28 of which is journaled in the lower rear ends of said frame. The numeral 29 indicates a bracket pivoted on the roller shaft 28 and provided with an upstanding arm $29^a$. The belt 25—26 runs over and under the drum 27 and under the tightening drum 30 and, in the preferred arrangement, will be driven by its own tractive engagement with the ground. To increase the tractive action of the belt, its slats 25 are provided with outwardly turned flanges or ends $25^a$.

The numeral 31 indicates metal bars or braces, which, at their rear ends, are rigidly secured to the sides of the excavator frame 20 and, at their front ends, are connected to a cross member $17^a$ of the A-frame 17. Rigidly secured on the bowed portion 32 is a bar 34 to which a stub pole 35 is connected for horizontal swinging movements by a vertical pivot 36. The spindle-connecting rod 19 is intermediately pivoted to said stub pole 35. The pole proper 37 is connected to the stub pole 35 for vertical movements, by a horizontal pivot bolt 38.

Rigidly secured on the pole 37, concentric to the pivot 38, is a latch arch 39, to which a latch lever 40 is adapted to be locked in different adjustments. This lever 40 is connected by a long rod 41 to the arm $29^a$ of the pivoted bracket 29. Said lever 40 is also connected by rods 42 to short levers 43 intermediately fulcrumed to a frame 17 by links 44. The shaft 23 of the drum 24 is passed through perforations in the upper ends of the levers 43, for an important purpose presently to be noted.

The numeral 45 indicates a transversely inclined discharge chute which is positioned to receive the earth from the elevator belt and to discharge the same at one side of the machine and, as shown, is supported from the frame 20 by arms 46.

For digging up the earth and delivering the same onto the receiving portion of the elevator belt, we provide a curved or segmental shovel 47 that is wider than said elevator belt. This shovel at its lower portion is pivoted at 48 to the curved rear end of a lever-acting shovel-supporting frame or bar 49, the front end of which is forked so that it embraces the elevator frame 20 and is pivotally connected thereto by pivot bolts 50. For yieldingly holding the shovel in operative position, but permitting it to move and prevent breakage in case it engages with a large stone or rock, a plunger-acting bolt 51 is pivoted to the upper portion of said shovel and is passed through a guide on the frame 49 and provided at its threaded end with a nut 52. A coiled spring 53 surrounds the bolt 51 and is compressed between the nut 52 and the frame 49.

The numeral 54 indicates a bell crank lever, which, at its elbow, is pivoted to the shovel-supporting frame 49. The upwardly extended arm of this bell crank 54 is connected by a rod 55 to the lower end of a latch lever 56 adapted to be secured in different adjustments to a latch segment 57 rigid on the A-frame structure 17. A rod 58 is pivoted at its lower end to the supporting bracket 29 and, at its upper end, is passed freely through a perforation in the lower arm of the bell crank 54. The numeral 59 indicates a coiled spring that surrounds the upper portion of the rod 58 and is compressed between the lower arm of the bell crank 54 and a nut 60 on the threaded upper end of said rod. The numeral 61 indicates so-called reaming plates that are pivotally connected to the shovel-supporting frame 49 for lateral adjustments, and are adapted to be secured in differently diverging positions by a nut-equipped bolt 63′ shown as passed through slots in the overlapped portions of said plates, see particularly Figs. 1 and 2. At their outer edges, the plates 61 have forwardly projecting knives or cutting blades 61$^a$ which shear the dirt at the upper portion of the sides of the ditch and deliver the same directly onto the top or receiving portion of the elevator belt. These shearing plates are held in upright position by trussed rods 63 attached to the upper portions thereof and to the front portion of the frame 49. Of course, the curved shovel 47 will direct the uplifted earth directly onto the upwardly moving portion of the elevator belt. This elevator belt, in the arrangement described, will be driven directly by its own contact with the ground and at a speed that is the same as that of the forward travel of the machine.

As the shovel 47 and the receiving portion of the elevator belt are lowered deeper into the trench, the roller 30 should be lowered in respect to the elevator frame and, hence, kept approximately horizontal and approximately parallel to the pole. This adjustment may be accomplished by movements of the lever 40, but, with said lever in a fixed position on the pole, such adjustments will be approximately produced because, as the rear portion of the elevator lowers, moving on the pivot at 16, the rod 41 will be, in effect, pulled forward, thereby keeping the bracket 29 always horizontal. At the same time, such movement has the effect of pulling forward on the rod 42, thereby moving the shaft 23 and drum 24 rearward, so as to compensate for the slight shortening of the elevator belt produced by the downward movement and adjustment of the roller 30 in the manner stated.

When the rear portion of the elevator belt is raised, the actions above described will be reversed, that is, the roller 30 and the shaft 23 and drum 24 will be moved forward. Thus, the required adjustments are accomplished automatically. However, by adjustments of the lever 40, the roller 30 can be moved to put the elevator belt under any desired tension or to compensate for varying length thereof.

The operator's seat 64, as shown, is secured to an approximately horizontal bar 65, which, at its front end, is shown as pivotally supported on the shaft 21, and, at its rear end, works adjustably on an upright supporting port 66, which, at its lower end, is pivotally supported on the bolts 50. To maintain the seat-supporting bar 65 approximately horizontal for different adjustments of the elevator, the post 66, as shown, is provided with ratchet-like notches 67 adapted to be engaged by a pin 68 on the rear end of said bar 65, said elements 67 and 68 being yieldingly held in engagement by a spring 69 on said bar.

The numeral 70 indicates a gauge wheel journaled to the rear end of a lever 71 that is intermediately pivoted to the rear portion of the frame 49 and which lever may be operated in any suitable way, not necessary for the purposes of this case to consider. In fact, the roller 70 and lever 71 may be omitted so far as the broad idea of this invention is concerned. When the lever 40 is moved forward from the position shown in Fig. 1, it tends to lower the roller 30, but as the latter cannot move downward, the rear ends of the bracket 29 and the elevator frame 20 must rise, and has the effect of lowering the gauge wheel 70 and causing the shovel 47 to move upward to or toward an elevated position in which its lower edge will be as high as the lower portion of the elevator belt, thus interrupting the excavating action.

We also preferably employ reaming disks 72, one on each side of the shovel 47, and, as shown, these reaming disks are journaled on the projecting ends of the roller shaft 28, see Figs. 1 and 2. These disks serve to plane off or true up the sides of the ditch and to assist in delivering the dirt to the elevator belt.

To assist in guiding the ditcher along the ditch, a gauge bar 73 is intermediately pivoted to the pole 37 with its lower end extending down into the ditch. The upper end of this gauge bar is shown as connected to a cord 74 attached to the lever 56. When the lever 56 is moved rearward to throw the excavating devices out of action, the cord 74 will pull the gauge bar 73 into an inoperative position or said gauge bar may be thus moved by directly pulling on said cord.

The dotted lines marked A, Figs. 1 and 2, indicate the outline of a wagon or four-wheeled truck, to which the ditcher may be attached in some instances.

It will be noted that not only does the elevator belt run at the same speed as the forward travel of the machine, and that the shovel or plow projects below the lowermost ground-engaging portion of the elevator belt, but that the ground-engaging portion of said belt operates as a gauge to limit the depth of cut of the shovel or plow. For instance, if the cutting edge of the shovel is set four inches below the ground-engaging portion of the elevator belt, then the plow will be positively engaged for a four-inch cut. Moreover, with this arrangement, the plow tends to pull downward on the ground-engaging portion of the traction belt, thereby increasing the tractive engagement between the belt and ground. This arrangement is highly important, regardless of the means by which the elevator belt is driven.

It will, of course, be understood that the weight of the lower portion of the excavator will be such as to hold the rear portion of the belt down and the plow to its work.

What we claim is:

1. In a ditcher, an elevator belt having a portion arranged to run in contact with the ground, and a shovel having its cutting edge located below the ground-engaging portion of said elevator belt, the ground-engaging portion of said belt serving as a gauge to limit the depth of cut of said shovel.

2. In a ditcher, a forwardly inclined belt having a rear ground-engaging portion, and a curved shovel located at the rear of said belt and having its cutting edge located below the ground-engaging portion of said belt and in the excavating action producing a downward pull on the ground-engaging portion of said belt, the latter serving to limit the depth of cut of said shovel.

3. In a ditcher, an elevator belt having a portion arranged to run in contact with the ground, and a shovel having its cutting edge located below the ground engaging portion of said elevator belt, the ground-engaging portion of said belt serving as a gauge to limit the depth of cut of said shovel, said elevator belt being driven at approximately the same speed as the forward travel of the machine.

4. In a ditcher, a forwardly inclined belt having a rear ground-engaging portion, a curved shovel located at the rear of said belt and having its cutting edge located below the ground-engaging portion of said belt and in the excavating action producing a downward pull on the ground-engaging portion of said belt, the latter serving to limit the depth of cut of said shovel, said elevator belt being driven at approximately the same speed as the forward travel of the machine.

5. In a ditcher, an elevator belt having a portion arranged to run in contact with the ground, and a shovel having its cutting edge located below the ground-engaging portion of said elevator belt, the ground-engaging portion of said belt serving as a gauge to limit the depth of cut of said shovel, said shovel being adjustable toward and from the ground-engaging portion of said belt.

6. In a ditcher, a forwardly inclined belt having a rear ground-engaging portion, a curved shovel located at the rear of said belt and having its cutting edge located below the ground-engaging portion of said belt and in the excavating action producing a downward pull on the ground-engaging portion of said belt, the latter serving to limit the depth of cut of said shovel, said shovel being arranged for oscillatory adjustment toward and from the rear end of the ground engaging portion of said elevator belt.

7. In a ditcher, the combination with a truck and an elevator frame pivotally connected thereto, of an elevator belt movable over suitable guides on said elevator frame and having a ground-engaging portion, and a shovel cooperating with the ground-engaging portion of said belt and extending to a point below the same, said shovel having a downward pulling action on the ground-engaging portion of said belt, and the latter serving to limit the depth of cut of said shovel.

8. In a ditcher, the combination with a truck and an elevator frame pivotally connected thereto, of an elevator belt movable over suitable guides on said elevator frame and having a ground-engaging portion, and a shovel co-operating with the ground engaging portion of said belt and extending to a point below the same, said shovel having a downward pulling action on the ground-engaging portion of said belt, and the latter serving to limit the depth of cut of said shovel, said shovel being adjustable toward and from the ground engaging portion of said belt.

9. In an excavator, the combination with an elevator belt having a ground-engaging portion, and a shovel cooperating with the ground-engaging portion of said belt, of reaming plates carried on opposite sides of the ground-engaging portion of said belt and spaced farther apart than the width of said belt so as to widen the ditch and afford clearance for the elevator belt and cooperating elevator mechanism.

10. In a ditcher, a forwardly inclined belt having a rear ground-engaging portion, a curved shovel located at the rear of said belt and having its cutting edge located below the ground-engaging portion of said belt and in the excavating action producing a downward pull on the ground-engaging portion of said belt, the latter serving to limit the depth of cut of said shovel, and reaming plates carried on opposite sides of the ground-engaging portion of said elevator belt and spaced farther apart than the width of said belt to afford clearance for said belt and co-operating elevator mechanism.

11. In a ditching machine, the combination with a suitably supported forwardly inclined conveyor, of a curved shovel spaced rearwardly with respect to the lower end of the conveyor, and spring means associated with the shovel to permit the lower end thereof to be tilted rearwardly by an object engaging and resisting the normal forward motion of the shovel.

12. In a ditching machine, the combination with a suitably supported forwardly inclined conveyor, of a curved shovel mounted upon a transverse pivot rearwardly of the lower end of the conveyor so as to be tiltable into an inoperative position when resisted by an object at its lower edge, and spring means for returning the shovel to its normal operating position when the object has been passed.

13. In a ditching machine, a forwardly inclined conveyor boom having an endless conveyor operating therein, means for supporting the boom with its rear end in a ditch, a shovel tiltably arranged rearwardly of the conveyor to deliver material thereto from the bottom of the ditch, and spring means for releasably retaining the shovel in its operative position.

14. The combination in a ditching machine, of means for conveying material upwardly and forwardly from the ditch bottom, a shovel arranged rearwardly with respect to the lower end of the conveying means to cooperate therewith as the machine moves forward, and means for mounting the shovel whereby its lower end will yield rearwardly when its cutting edge strikes an unyielding object in the ground.

15. In a ditching machine, a forwardly inclined suitably supported conveyor boom having an endless carrier for delivering material upwardly from the ditch, a shovel arranged to co-operate with the rear end of the carrier to deliver material thereto from the bottom of the ditch, a shovel frame connecting the shovel to the boom, and spring means for yieldingly holding the shovel in its normal operating position.

16. In a ditching machine, a forwardly inclined suitably supported conveyor boom having an endless carrier for delivering material upwardly from the ditch, a shovel arranged to co-operate with the rear end of the carrier to deliver material thereto from the bottom of the ditch, a shovel frame connecting the shovel to the boom, and a vertically acting spring device connecting the boom and shovel frame for yieldingly retaining them in relatively normal operating position.

17. In a ditching machine, a forwardly inclined suitably supported conveyor boom having an endless carrier for delivering material upwardly from the ditch, a shovel arranged to co-operate with the rear end of the carrier to deliver material thereto from the bottom of the ditch, a shovel frame pivotally secured at its forward end to the boom, and pivotally supporting the shovel at its rear end, and spring means for yieldingly retaining the shovel, shovel frame and boom in normal operating positions with respect to each other.

18. In a ditching machine, a forwardly inclined suitably supported conveyor boom having an endless carrier for delivering material upwardly from the ditch, a digging device connected to the boom and operating rearwardly thereof to deliver material from the bottom of the ditch to the carrier as the machine moves forward, and means including a spring for adjustably connecting the digging device and the lower end of the boom together to retain them in relatively normal operating position.

19. The combination with a ditching machine having a forwardly inclined conveyor, of a shovel frame adjustably secured to the conveyor and extending rearwardly thereof, a shovel tiltably secured to the rear end of the frame, and arranged to deliver material from the ditch bottom to the conveyor, and spring means for normally retaining the shovel in operative position with respect to the conveyor.

20. The combination with a ditching machine having an inclined conveyor boom and an endless carrier mounted upon shafts at the opposite ends of the boom, of means for delivering material from the bottom of the ditch to the endless carrier, and reaming members carried by the opposite ends of the lower of said shafts so as to rotate therewith.

21. The combination with a ditching machine having a forwardly inclined conveyor to deliver material from the ditch, of a pair of reaming members rotatably mounted one at each side of the lower end of the conveyor, and means for rotating said members.

22. The combination with a ditching machine having a forwardly inclined conveyor to deliver material from the ditch, of a driver's support mounted over the conveyor and pivotally connected to the front end thereof, and vertically adjustable means supporting the driver's support from a rear part of the conveyor.

23. The combination with a ditching machine having a forwardly inclined conveyor to deliver material from the ditch, of a substantially horizontal seat frame arranged over the conveyor and pivotally connected at its front end thereto, and means for adjustably securing the seat frame with respect to a rearward part of the conveyor, whereby the seat may be lowered and raised when the rear end of the conveyor is raised and lowered in the ditch.

In testimony whereof we affix our signatures.

ANDREAN G. RONNING.
ADOLPH RONNING.